Nov. 24, 1959  W. STELZER  2,913,877
BOOSTER BRAKE MECHANISM
Filed Nov. 29, 1956
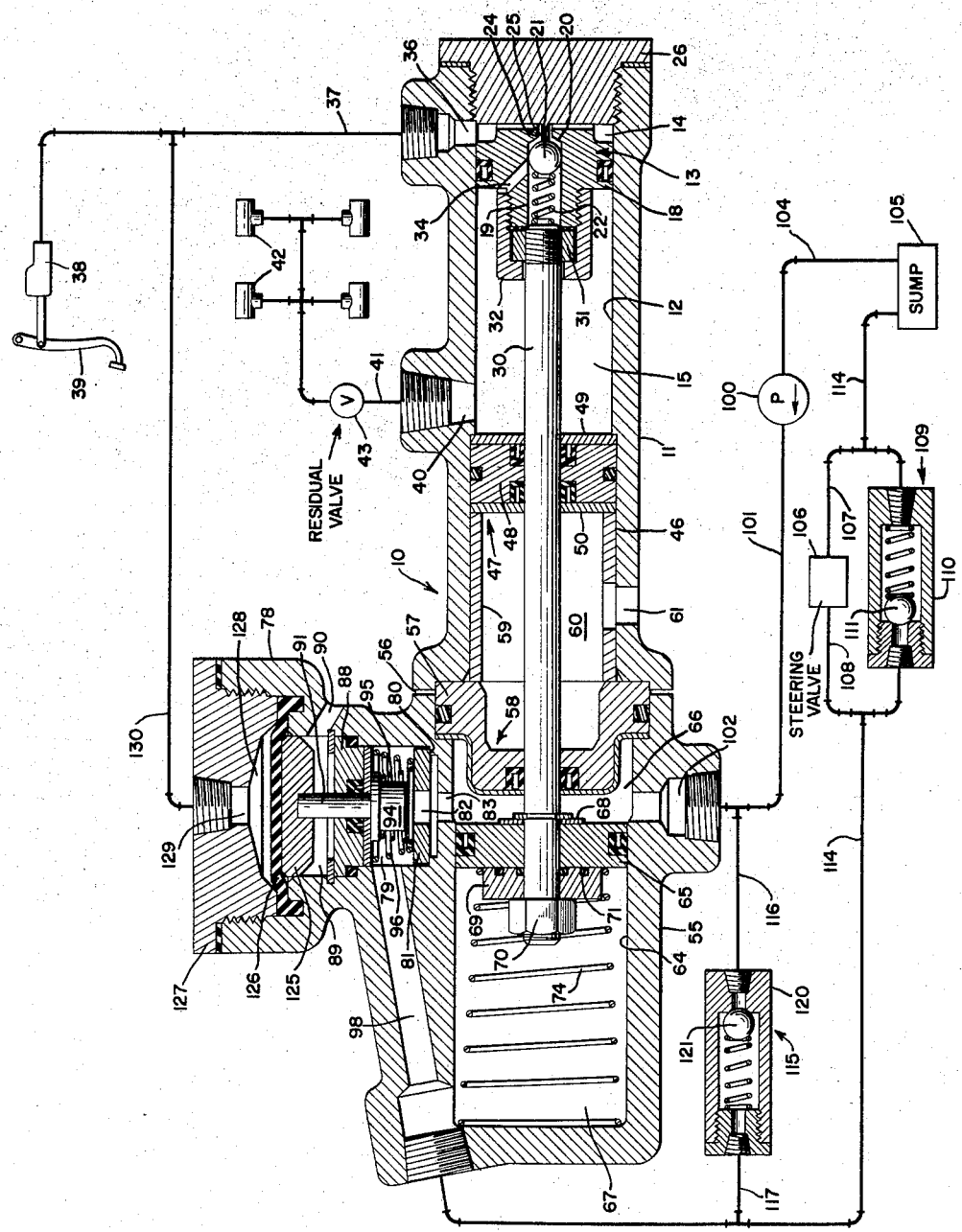
INVENTOR
WILLIAM STELZER
BY John F. Phillips
ATTORNEY

United States Patent Office 2,913,877
Patented Nov. 24, 1959

2,913,877
BOOSTER BRAKE MECHANISM

William Stelzer, Bloomfield Hills, Mich., assignor to Kelsey-Hayes Company, a corporation of Delaware Application November 29, 1956, Serial No. 625,070

6 Claims. (Cl. 60—52)

This invention relates to booster brake mechanisms, and more particularly to such a mechanism which is operable by hydraulic pressure.

An important object of the invention is to provide a booster brake mechanism for motor vehicles having a booster motor provided with a piston dividing it into normally balanced-pressure chambers and to provide novel means for effecting an unbalancing of the pressures in the two chambers to actuate the motor without the use of follow-up valve means.

A further object is to provide such a mechanism wherein the motor is hydraulically operated by the flow of pumped fluid into one motor chamber and which fluid is bypassed into the other motor chamber to balance pressures on opposite sides of the piston, and to provide pedal controlled means for throttling the flow of hydraulic fluid from the first-named motor chamber to the other chamber to result in the building up of pressure in the first-named chamber to actuate the motor.

A further object is to provide such an apparatus wherein the throttling of the flow of hydraulic fluid from one motor chamber to the other is effected by the pedal operation of a master cylinder, the booster ratio of motor power to brake pedal power being predetermined and the apparatus being such as to provide perfect pedal feel.

A further object is to provide a mechanism of the character just referred to wherein perfect reaction feel to the brake pedal is provided hydraulically and wherein the transmission of reaction to the brake pedal is retarded in the initial stage of brake application until a certain secondary pressure is generated by the motor to expand the brake shoes into engagement with the drums.

A further object is to provide such an apparatus in which a full and sensitive modulation is effected by means of a simple throttling device without the use of follow-up valves.

Other objects and advantages of the invention will become apparent during the course of the following description.

In the drawing I have shown one embodiment of the invention. In this showing:

The figure is a sectional view through a hydraulic motor and associated parts employed with the present invention, other elements of the system being diagrammatically shown.

Referring to the drawing, the numeral 10 designates a preferably cast elongated body having a portion 11 provided therein with a cylinder 12. A piston 13 is movable in the cylinder 12 and divides the latter to form a primary chamber 14 and a secondary chamber 15.

The piston 13 comprises a body 18 having a bore 19 therein provided at one end with a seat 20 engageable by a ball valve 21 biased to closed position by a spring 22. The bore 19 communicates with a reduced opening 24 through which projects a stem 25 carried by a plug 26 threaded in the adjacent end of the cylinder.

A rod 30 is mounted axially in the cylinder 12 and is threaded at one end in a nut 31 arranged in a cap 32 threaded on the piston body 18. The end of the rod 30 adjacent the spring 22 engages one end of such spring to act as a spring seat. It will be apparent that the ball valve 21 is maintained in open position by the stem 25 when the parts are in the off positions shown in the drawing. The bore 19 communicates with the secondary chamber 15 through a passage 34. Accordingly, it will be apparent that when the parts are in the off positions shown, the chambers 14 and 15 communicate with each other.

The body 11 is provided with a port 36 communicating with the chamber 14 and connected to one end of a pipe line 37 leading to a conventional master cylinder 38 operable by a pedal 39. It will be apparent that operation of the pedal 39 displaces fluid from the master cylinder 38 into the chamber 14. The secondary chamber 15 communicates with a port 40 leading through suitable hydraulic lines 41 to the wheel cylinders 42 of the vehicle, and the outlet line leading from the port 41 may be provided with a conventional residual valve 43 forming per se no part of the present invention.

At the left-hand end of the chamber 15, the body 11 is provided with a bore 46, somewhat larger than the cylinder 12 and in which is arranged a partition 47 formed of a central body 48 and provided at opposite sides with disks 49 and 50. The rod 30 projects through the partition 47, and the body 48 is suitably sealed with respect to the rod 30 and bore 46. The disk 49 seats against the shoulder formed at the right-hand extremity of the bore 46.

Another main body 55 is arranged in axial alinement with the body 11, the two bodies referred to being separated at the point 56. Inasmuch as the bodies 11 and 55 are assembled into a single unit and form in effect a single body, they have been so indicated by section lining. The adjacent ends of the bodies 11 and 55 are recessed to receive an external annular flange 57 formed on a second partition 58 suitably sealed with respect to the recess in which the flange 57 is arranged and similarly sealed with respect to the rod 30. A sleeve 59 engages at one end against the partition 57 and at its other end against the disk 50 to maintain the parts in proper position. The sleeve 59 forms therein an atmospheric chamber 60 open to the atmosphere as at 61. The body 55 is bored as at 64 to provide a cylinder in which is slidable a piston 65 dividing the interior of the body 55 to form a pair of chambers 66 and 67. Preferably, the piston 65 floats on the rod 30 to avoid the problem of axially alining the various elements through which the rod 30 projects. A seat 68, carried by the rod 30, engages against one side of the piston 65, and the other side of such piston is engaged by a collar 69 retained on the rod 30 by a nut 70. O-rings 71 are arranged in annular recesses in the collar 69 to provide a sealing engagement between the piston 65 and collar 69. It will be apparent that the piston 65 is fixed against axial movement relative to the rod 30 and normally occupies the off position shown in the drawing. The piston 65 is biased to such position by a return spring 74.

The body 55 is provided with a relatively large, laterally extending integral portion 78 having an internal chamber 79 reduced in size at its lower end as at 80 to form a seat engageable by a disk 81. This disk is provided with an axial opening 82 communicating through an opening 83 with the chamber 66.

A sealed bearing 88 is arranged in the top of the chamber 79 and divides such chamber from an atmospheric chamber 89 open to the atmosphere as at 90. A stem 91 is slidable through the bearing 88 and carries at its lower end a valve 94 of larger diameter than the opening 82 and movable downwardly into engagement with the upper face of the disk 81, which functions as a valve seat, under conditions to be described. A light spring 95 biases the valve 94 upwardly, and a somewhat heavier spring 96 biases the disk 81 downwardly. These springs and the valve 94 are arranged in the chamber 79, and such chamber communicates through a passage or duct 98 with the chamber 67.

A hydraulic pump 100 has an outlet line 101 connected to a port 102 communicating with the chamber 66. The inlet line 104 of the pump leads from a sump 105 to supply hydraulic fluid to the pump.

A conventional steering valve 106, employed for controlling the valve of a power steering mechanism with which the present apparatus is adapted to be used, is connected to flow lines 107 and 108 leading to opposite ends of a relief valve 109 comprising a casing 110 and a check valve 111 therein biased to closed position as shown. The line 107 is connected by a branch line 114 to the sump 105 for the return of fluid through the steering valve to the sump, as will be apparent.

The line 108 is connected to one end of a line 114 the other end of which is connected to the passage 98. A second relief valve 115 is connected by lines 116 and 117 to the respective lines 101 and 114. The relief valve 115 comprises a casing 120 having a check valve 121 therein biased to closed position as shown.

Means are provided for determining the relative pressures in the chambers 66 and 67 to thus determine the differential pressures acting on the piston 65 when the brakes are operated. Such means also serves to transmit direct hydraulic reaction to the brake pedal 39. The chamber 89 is formed as a cylinder and a piston 125 is vertically movable in such cylinder and engages the upper end of the stem 91. A diaphragm 126 is arranged over the piston 125 and is secured in position by a cap 127 forming with the diaphragm 126 a chamber 128. A port 129 in the top of this chamber is connected to one end of a hydraulic line 130, and the other end of such line is connected to the hydraulic line 37.

*Operation*

The parts normally occupy the positions shown in the drawing. Hydraulic fluid from the pump 100 flows through port 102 into chamber 66, through ports 83 and 82 and chamber 79, through passage 98, thence through lines 114 and 108 through the steering valve 106 and lines 107 and 114 to the sump 105. The steering valve is conventional and operates in the well-known manner.

The spring 95 biases the valve 94 to open position and the flow of fluid in the manner described above takes place freely. Since the passage 98 communicates with the chamber 67, pressures remain balanced in the chambers 66 and 67. It also will be noted that the plunger 13 is in its normal off position with the ball 21 unseated to connect the chambers 14 and 15.

When the system is to be operated, the pedal 39 will be moved to displace fluid from the master cylinder 38 into the chamber 14 and through line 130 into the chamber 128. This operation will displace the diaphragm 126 downwardly together with the stem 91 and throttling valve 94 against the tension of the light spring 95. Thus the flow of hydraulic fluid through ports 82 and 83 into the chamber 79 will be restricted and pressure will start to build up in the chamber 66. The tension of the spring 95 is such that the operation referred to will start at relatively low master cylinder pressures, for example approximately from 10–15 p.s.i. The building up of pressure in the chamber 66 incident to throttling the port 82 starts the piston 65 moving to the left, together with the plunger 13. Upon initial movement of such plunger away from the nut 26, the valve 21 will close and pressures built up in the chamber 14 by operation of the brake pedal will be transmitted to the plunger 13, thus assisting the piston 65 in displacing fluid from the chamber 15 into the brake lines.

Thus fluid will be transmitted under pressure to the wheel cylinders, such pressure being generated partly by the operator and partly by the motor piston 65. After a certain pressure has been reached, the spring 96 will start to yield, and such pressure will be determined by the loading of the spring 96. The force exerted against the spring 96 will be due to upward movement of the disk 81 to "crack" it from its seat 80. The disk 81 will be in engagement with the valve 94, and differential pressures transmitted through port 83 will act on the entire lower area of the disk 81, thus providing greater upward pressure against the diaphragm 126 than was true upon the initial operation of the device when the hydraulic pressure acted upwardly solely on the bottom of the valve 94.

The upward forces transmitted through stem 91 oppose pressures in the chamber 128, thus transmitting hydraulic reaction to the brake pedal 39. It will be apparent that during initial stages the hydraulic reaction will be determined by the smaller area of the valve 94 exposed to pressures in the motor chamber 66. In later stages of operation, the reaction pressures will result from the exposure of the lower face of the disk 81 plus the exposed area of the valve 94 to pressures in the chamber 66. Accordingly, the device provides two stages of reaction, the pedal being relatively "soft" in initial stages and encountering heavier reactions in later stages.

The apparatus requires no follow-up valve in the accepted sense of the term and the energization of the hydraulic motor takes place to an extent proportional to the exertion of pressure against the brake pedal 39. If the pedal is depressed without making a full brake application, the degree of energization of the hydraulic motor will increase up to the point where pressure in the chamber 66 will provide for leakage around the valve 94 and disk 81 into the line 98, and energization of the motor therefore takes place to an extent proportional to pressures in the chamber 128. The latter pressure of course is determined by operation of the brake pedal 39.

It will be noted that the valve 94 and disk 81 do not control the actual pressure in the chamber 66 since such pressure is supplied by the pump 100. The throttling means referred to merely determines the difference in pressures on opposite sides of the piston 65. Thus if the power steering valve is in operation, a substantial pressure may exist in chambers 66 and 67, but these pressures will be balanced and no brake operation will take place unless it is intended. The only effect of the increased pressures due to steering valve operation will be that greater effective pressure will act against the piston 65 from the chamber 67 than from the chamber 66 due to the subtraction of the cross sectional area of the rod 30 from the effective area of the piston 65 exposed to pressure in the chamber 66. This results solely in some additional forces urging the pistons 13 and 65 to the off positions shown.

When the brake pedal is released, the pressure in the chamber 128 will be released, hence the spring 96 will maintain the disk 81 on its seat 80 and the spring 95 will move the valve 94 to its fully open position shown, thus immediately balancing pressures in the chambers 66 and 67. The return spring 74 will move the parts back to the positions shown.

In the event the pump 100 is not running when a brake application is made, fluid from the master cylinder will pass around the ball valve 21 into the chamber 15 and thence into the brake lines to manually apply the brakes. If the manually generated pressure is sufficiently high, the piston 18 may be moved to the left but this obviously makes no difference in the transmission of fluid into the brake cylinders.

The bypass valve 115 is shown diagrammatically, and it is obvious that it can be built into the booster unit.

This bypass limits the maximum power of the booster to always leave adequate power for the operation of the steering booster. Pressures in the chamber 66 will be duplicated against the ball 121 through line 116, and the spring behind the ball may be set to open at any desired pressure. For example, the valve 121 may open at approximately 400 p.s.i., while the conventional steering booster relief valve 109 may open at approximately 800 p.s.i. This valve is shown as bypassing the steering valve 106 instead of the pump. In an extreme condition with maximum power available for steering and braking, the pump could theoretically deliver 1200 p.s.i., but it is apparent that maximum power for steering is required only when the vehicle is not moving and when very little power is required to operate the brakes.

From the foregoing, it will be apparent that the present construction provides novel means for determining differential pressures affecting a motor piston by employing, in a sense, what is a reversal of the usual procedure. Instead of a follow-up valve controlling the admission of pressure into the chamber 66, a source of steady pressure is used in the medium of a pump, and the effective hydraulic motor pressures are determined by regulating communication between the two ends of the hydraulic motor. The means for so controlling energization of the motor is pressure-opposed by pedal generated master cylinder pressures. Accordingly, the throttling of the connection between the chambers 66 and 67 is determined in accordance with brake pedal operation, and the means employed for this purpose transmits direct hydraulic reaction to the pedal, as is highly desirable. This reaction is always proportional to the degree of motor energization and accordingly is proportional to the hydraulic pressures being applied to the brakes.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A motor mechanism comprising a casing, a pressure responsive unit in said casing dividing it to form a pair of chambers, a pump connected to one of said chambers to constantly supply fluid thereto, a bypass connected between said chambers, a return duct to said pump connected to said bypass, and throttling means arranged in said bypass and normally inoperative to restrict flow of fluid through said bypass whereby pressures in said chambers will be substantially balanced, said throttling means being movable to restrict the flow of fluid through said bypass whereby the supply of fluid from said pump to said one chamber will build up a pressure in such chamber higher than the pressure in said other chamber to effect movement of said pressure responsive unit, said throttling means comprising a seat having an opening therethrough of substantial size between said one chamber and said bypass, a disk engaging said seat and having an opening therethrough smaller than said first-named opening, a valve engageable with said disk to close said last-named opening, a spring biasing said valve to open position, control means connected to apply a force to said valve to tend to move it into engagement with said disk, and means biasing said disk into engagement with said first-named seat whereby, when said valve closes said second-named opening, the area of said disk and said valve exposed to pressure in said one chamber will both be subjected to pressure in said one chamber to tend to oppose said control means.

2. A motor mechanism comprising a casing, a pressure responsive unit in said casing dividing it to form a pair of chambers, a bypass connecting one of said chambers to the other of said chambers adjacent the end thereof remote from said one chamber, a hydraulic pump having its outlet connected to said one chamber, return means connected at one end to the inlet of said pump and at its other end to said bypass at a point adjacent the connection of the latter with said other chamber, a valve seat in said bypass adjacent said one chamber and provided with an opening therethrough, a valve having a normal open position for the free flow of hydraulic fluid through said opening and through said bypass whereby pressures will be normally substantially balanced in said chambers, said valve being movable toward said opening to restrict the flow of hydraulic fluid therethrough whereby said pump will generate higher pressure in said one chamber than in said other chamber, a hydraulic control chamber having a movable wall connected to said valve, and means for supplying hydraulic fluid to said control chamber to effect movement of said valve toward said seat, said means for supplying hydraulic fluid to said control chamber comprising a master cylinder having a pedal for operating it, increases in pressure in said one chamber acting on said valve opposing movement of said movable wall to react against said pedal, said valve seat comprising a disk, said casing having a second valve seat substantially larger than said opening exposed to pressure in said one chamber and normally engaged by said disk, and a spring biasing said disk into engagement with said second seat whereby, after said valve has been moved toward closed position and pressure increases to a predetermined point in said one chamber, the entire area of said disk open to said one chamber will be subject to hydraulic pressures opposing the supply of fluid to said control chamber by operation of said pedal.

3. A motor mechanism comprising a cast body having a cylinder provided with a piston therein, a chamber in said body, a port communicating with one end of said cylinder, a bypass duct connected between said chamber and the other end of said cylinder, a valve seat in said chamber having an opening communicating with said port, a normally open valve engageable with said seat to close communication between the ends of said cylinder, pump means connected to said one end of said cylinder for constantly supplying hydraulic fluid thereto, and means exerting a force on said valve to move it toward said seat to restrict the flow of hydraulic fluid therethrough whereby pressure will be built up in said one end of said cylinder by said pump means to move said piston, said means for moving said valve toward said seat comprising a hydraulic chamber having a pressure movable wall connected to said valve, and manually operable means connected to said hydraulic chamber for supplying fluid thereto to move said movable wall, said valve seat comprising a disk having said opening therethrough, a second seat formed in said body and on which said disk seats, said disk having an area substantially larger than said opening exposed to said end of said cylinder, and a spring biasing said disk against said second seat whereby, after said valve is moved toward closed position sufficiently for a predetermined pressure to be built up in said one end of said cylinder, said disk will be moved from said second seat to increase resistance to movement of said valve toward said opening.

4. A motor mechanism comprising a casing, a pressure responsive unit in said casing dividing it to form a pair of chambers, a fluid inlet communicating with one of said chambers to constantly supply pumped fluid thereto, a fluid outlet communicating with the other of said chambers, a passage communicating between said chambers, and throttling means arranged in said passage and normally inoperative to restrict flow of fluid through said passage whereby pressures in said chambers will be substantially balanced, said throttling means being movable to restrict the flow of fluid through said passage whereby the supply of fluid through said fluid inlet to said one chamber will build up a pressure in such chamber higher than the pressure in said other chamber to effect movement of said pressure responsive unit, said throttling means comprising a control valve assembly including plural portions subject to pressures in said one chamber, control means connected to apply force to one of said plural portions independent of the other of said plural portions to throttle the fluid being pumped and cause an increased pressure in said one chamber, said one of said plural portions including an effective area subject to pressure in said one chamber to tend to oppose said control means and provide an initial stage of reaction, said other of said plural portions including an effective area subject to pressures in said one chamber and operative at a predetermined increased pressure to combine with said one of said plural portions to cumulatively oppose said control means and provide a second stage of reaction.

5. A motor mechanism according to claim 4 wherein said control means comprises a hydraulic control chamber including a pressure responsive movable wall operatively connected to said one of said plural portions, and manually operable fluid pressure generating means for supplying fluid pressure to said control chamber for effecting movement of said one of said plural portions.

6. A motor mechanism according to claim 4 in which said control valve assembly includes a seat between said chambers through which fluid is communicated, said other of said plural portions being biased toward said seat and including a portion through which fluid is communicated, said one of said plural portions being biased away from said other of said plural portions and engageable therewith for restricting fluid flow through said other of said plural portions.

References Cited in the file of this patent
UNITED STATES PATENTS

| | | |
|---|---|---|
| 1,890,010 | Vickers | Dec. 6, 1932 |
| 1,960,996 | Guernsey | May 29, 1934 |
| 1,962,857 | Cash | June 12, 1934 |
| 2,322,063 | Schnell | June 15, 1943 |
| 2,662,376 | Price et al. | Dec. 15, 1953 |
| 2,680,350 | Sprague et al. | June 8, 1954 |
| 2,687,189 | Schnell | Aug. 24, 1954 |